United States Patent
Brown

(10) Patent No.: US 8,716,365 B2
(45) Date of Patent: May 6, 2014

(54) OPACIFYING PARTICLES AND COMPOSITIONS FORMED THEREFROM

(75) Inventor: Ward T. Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 235 days.

(21) Appl. No.: 13/080,130

(22) Filed: Apr. 5, 2011

(65) Prior Publication Data

US 2011/0251304 A1 Oct. 13, 2011

Related U.S. Application Data

(60) Provisional application No. 61/342,019, filed on Apr. 8, 2010.

(51) Int. Cl.
*C08K 9/04* (2006.01)

(52) U.S. Cl.
USPC .......................... 523/206; 523/205; 428/407

(58) Field of Classification Search
USPC .................................. 523/205, 206; 428/407
See application file for complete search history.

(56) References Cited

U.S. PATENT DOCUMENTS

| | | | | |
|---|---|---|---|---|
| 6,299,979 | B1 * | 10/2001 | Neubauer et al. | 428/407 |
| 6,890,983 | B2 | 5/2005 | Rosano | |
| 2003/0017348 | A1 | 1/2003 | Brown | |
| 2006/0009546 | A1 | 1/2006 | Brown | |
| 2010/0298483 | A1 | 11/2010 | Allen | |
| 2010/0298484 | A1 | 11/2010 | Allen | |

FOREIGN PATENT DOCUMENTS

| | | |
|---|---|---|
| EP | 0404184 A2 | 12/1990 |
| EP | 1832635 B1 | 1/2010 |
| JP | 2006124676 A | 5/2006 |
| WO | 2006037161 A1 | 4/2006 |

OTHER PUBLICATIONS

European Search Report issued in EP 11 15 9940, dated Aug. 7, 2012.

* cited by examiner

*Primary Examiner* — Vickey Nerangis
(74) *Attorney, Agent, or Firm* — Ronald D. Bakule; Karl E. Stauss

(57) ABSTRACT

An opacifying particle including a certain pigment particle at least partially encapsulated in a polymeric shell having a calculated thickness of from 35 nm to 200 nm, the polymeric shell including at least a first polymer phase and a second polymer phase, wherein the first polymer is substantially in contact with the surface of the pigment particle providing a calculated shell thickness of at least 25 nm and wherein the first polymer has a refractive index of at least 0.03 units less than that of the second polymer is provided. Further provided is a composition including certain pigment particles at least partially encapsulated in a shell of a first polymer having a calculated thickness of from 25 nm to 200 nm, and the encapsulated pigment particles in contact with a second polymer, wherein the first polymer has a refractive index of at least 0.03 units less than that of the second polymer.

5 Claims, No Drawings

OPACIFYING PARTICLES AND COMPOSITIONS FORMED THEREFROM

This application claims the benefit of priority under 35 U.S.C. §119(e) of U.S. Provisional Patent Application No. 61/342,019 filed on Apr. 8, 2010.

This invention relates to opacifying particles and compositions including opacifying particles. More specifically, the invention relates to an opacifying particle including a pigment particle having an average particle diameter of from 0.15 micron to 1.0 micron and a refractive index of at least 1.8, the pigment particle being at least partially encapsulated in a polymeric shell having a calculated thickness of from 35 nm to 200 nm, wherein the polymeric shell includes at least a first polymer phase and a second polymer phase, wherein the first polymer phase is substantially in contact with the surface of the pigment particle providing a calculated shell thickness of at least 25 nm and wherein the first polymer has a refractive index of at least 0.03 units less than the refractive index of the second polymer; and compositions including the opacifying particle. Also, the invention relates to a composition including pigment particles having an average particle diameter of from 0.15 micron to 1.0 micron and a refractive index of at least 1.8, the pigment particles being at least partially encapsulated in a shell of a first polymer having a calculated thickness of from 25 nm to 200 nm, with the encapsulated pigment particles in contact with from 10% to 600% by weight, based on the weight of the first polymer, second polymer, wherein the first polymer has a refractive index of at least 0.03 units less than the refractive index of the second polymer.

Opacifying pigments and particles including opacifying pigments provide whiteness, and opacity or "hiding", to compositions, such as paints, and plastics. Such pigments are present in most coatings that are designed to provide an opaque coating on and to concealingly cover an undersurface or substrate surface to which the coating is applied. These pigments are also present in most plastics that are designed to be totally or partially opaque. In paints and plastics, an opacifying pigment is present whether the paint is white or colored. It is often desirable that opacifying coatings, paints, and plastics have a high opacifying efficiency so as to enable the coating or paint to completely conceal the undersurface, even if it is of a contrasting color, while utilizing a minimal thickness of the coating or paint, or plastic.

Opacifying coating and plastics manufacturers have long sought to formulate opacifying coating, paints, and plastics having a desired opacity by maximizing the level of hiding while minimizing the amount of opacifying pigment utilized. Without being bound by a particular theory, it is believed that opacifying effectiveness is in part a function of the difference in refractive indexes of opacifying pigment in the coating or plastic and the polymeric components of the coating or plastic. Higher light scattering efficiency occurs when the difference in refractive indexes of the opacifying pigment particles and the polymeric components of the coating or plastic are larger, and small increases in this difference of refractive indexes can have a significant effect on the opacity. The opacity of a coating or plastic can be optimized by choosing a polymer of low refractive index, however, other properties of the coating or plastic may be optimized by choosing a polymer with a higher refractive index. For example, coatings made with TiO2 as the pigment and acrylic polymers as the binder have higher opacity than similar coatings with utilize styrenic polymers as the binder since polyacrylates have a lower refractive index (1.48) than does polystyrene (1.60). However, coatings based on styrenic polymers may have better gloss, water resistance, or stain resistance than similar coatings based on acrylic polymers. We have discovered that by utilizing pigment particles that have been encapsulated with a shell, having a certain thickness, of lower refractive index polymer in a coating or plastic which employs a higher refractive index polymer for the majority of the polymeric material, a coating or plastic which has both high light scattering efficiency and the desirable properties of the high refractive index polymer can be made.

International Patent Publication No. 2006/037161 disclosed the opacifying pigment TiO2 encapsulated in a polymer shell. The encapsulating polymer shell has two phases, with an acrylic polymer phase in contact with the pigment surface and an outer acrylic/styrene copolymer phase. Also disclosed is a coating made from such encapsulated pigment particles in which the encapsulating polymer is the only binder in the coating. However, the low refractive index acrylic phase (20 nm) is too thin and the difference in refractive index between the low refractive index acrylic phase (1.48) and the higher refractive index acrylic/styrene polymer phase (1.50) is too small to provide a significant hiding advantage.

According to a first aspect of the present invention there is provided an opacifying particle comprising a pigment particle having an average particle diameter of from 0.15 micron to 1.0 micron and a refractive index of at least 1.8, said pigment particle being at least partially encapsulated in a polymeric shell having a calculated thickness of from 35 nm to 200 nm, wherein said polymeric shell comprises at least a first polymer phase and a second polymer phase, wherein said first polymer phase is substantially in contact with the surface of said pigment particle providing a calculated shell thickness of at least 25 nm and wherein said first polymer has a refractive index of at least 0.03 units less than the refractive index of said second polymer.

According to a second aspect of the present invention there is provided a composition comprising pigment particles having an average particle diameter of from 0.15 micron to 1.0 micron and a refractive index of at least 1.8, said pigment particles being at least partially encapsulated in a shell of a first polymer having a calculated thickness of from 25 nm to 200 nm, wherein said encapsulated pigment particles are in contact with from 10% to 600% by weight, based on the weight of said first polymer, second polymer, wherein said first polymer has a refractive index of at least 0.03 units less than the refractive index of said second polymer.

According to a third aspect of the present invention there is provided a composition comprising pigment particles having an average particle diameter of from 0.15 micron to 1.0 micron and a refractive index of at least 1.8, said pigment particles being at least partially encapsulated in a polymeric shell having a calculated thickness of from 35 nm to 200 nm, wherein said polymeric shell comprises at least a first polymer phase and a second polymer phase, wherein said first polymer phase is substantially in contact with the surface of said pigment particle providing a calculated shell thickness of at least 25 nm and wherein said first polymer has a refractive index of at least 0.03 units less than the refractive index of said second polymer.

The present invention relates to an opacifying particle that is an opacifying pigment encapsulated in polymer. The opacifying pigment particle has an average particle diameter of from 0.15 to 1 microns and a refractive index of at least 1.8. By "opacifying" herein is meant that the particle engenders opacity when subject to light of a certain wavelength, not necessarily visible light. For example, certain nano-particles included herein provide opacity when subject to light of wavelengths lower than the visible range. The shape of the pigment particles is not important. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes have average diameters in the range of from 150 nm to 1 micron, preferably in the range of from 200 nm to 500 nm, and more preferably, in the range of from 200 nm to 350 nm. Pigment particles having nonspherical shapes preferably have average diameters, defined as their maximum dimension, of from 150 nm to 1 micron, more preferably of from 200 nm to 500 nm, and most preferably of from 200 nm to 350 nm. The average diameters of pigment particles are typically provided by pigment particle suppliers.

The pigment particles are also characterized as having a refractive index [$n_D(20°$ C.)] that is at least 1.8, preferably at least 1.9, and more preferably at least 2.0. The indices of refraction for various materials are listed in *CRC Handbook of Chemistry and Physics*, 80th Edition, D. R. Lide, editor, CRC Press, Boca Raton, Fla., 1999, pages 4-139 to 4-146.

Suitable opacifying pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. A composition including two different forms of a material, such as rutile and anatase titanium dioxide, is considered to have two different pigments.

The pigment particles may have a uniform composition or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, zinc oxide, and zirconia. For example, in certain embodiments titanium dioxide particles suitable for use in coatings of the present invention may have a coating of silica and a coating of alumina.

The opacifying pigment particles encapsulated in polymer of the present invention may be prepared by any suitable means suitable including but not limited to the processes described in WO2006/037161, U.S. Pat. No. 7,579,081, and U.S. Provisional Application No. 61/216,584. Preferably the opacifying pigment particles encapsulated in polymer of the present invention are made via the processes in which the one or more polymer stages are emulsion polymerized in the presence of the pigment particle dispersed in an aqueous medium as described in U.S. Provisional Application No. 61/216,584.

The opacifying pigment encapsulated in polymer of the present invention includes the pigment particle being at least partially encapsulated in a polymeric shell having a calculated thickness of from 35 nm to 200 nm, wherein the polymeric shell includes at least a first polymer phase and a second polymer phase, wherein the first polymer phase is substantially in contact with the surface of the pigment particle providing a calculated shell thickness of at least 25 nm. The first polymer phase substantially includes first polymer; the second polymer phase substantially includes second polymer. In another aspect of the present invention the opacifying pigment encapsulated in polymer includes a first polymer shell with a thickness from 25 nm to 200 nm that at least partially encapsulates the pigment particle. By "at least partially encapsulated" herein is meant that the first polymer is in contact with at least a part of the surface of the pigment particle. The degree of encapsulation of the pigment particle may be determined using an electron micrograph. By "X % encapsulated" herein is meant that X % of the surface area of the pigment particle is in contact with the first polymer; preferably greater than 50%, more preferably greater than 75%, and most preferably 100% of the surface area of the particle is in contact with the first polymer. By "is substantially in contact with the surface of said pigment particle" herein is meant that the first polymer is in contact with at least a part of the surface of the pigment particle. The degree of contact with the pigment particle may be determined using an electron micrograph. By "X % encapsulated" herein is meant that X % of the surface area of the pigment particle is in contact with the first polymer; preferably greater than 50%, more preferably greater than 75%, and most preferably 100% of the surface area of the particle is in contact with the first polymer. The calculated thickness of the polymeric shell or of the first polymer shell is to be calculated from the weight percent of the polymer, such as, for example, first polymer, on the pigment particle and the average diameter of the pigment particle, according to the following equations:

$$(Vpp+Vfp)/Vpp=((Dpp+2*ST)/Dpp)\hat{\,}3$$

$$Vpp=100/DENSpp$$

$$Vfp=100*WPfp/DENSfp$$

where ST is the thickness of the first polymer, Dpp is the average diameter of the pigment particle, DENSpp is the density of the pigment particle, DENSfp is the density of the first polymer, and WPfp is the weight percent of the first polymer on the pigment particle as a decimal, i.e., if there is 50 g of first polymer for every 100 g of pigment particles, then WPfp=0.50. The thickness of the first polymer may be from 25 nm up to 200 nm; for TiO2 pigment, for example, preferred thickness of first polymer shell is typically from 40 nm to 150 nm, more preferably from 60 nm to 100 nm. Where the polymeric shell has more than one phase and the some of the phases have different refractive indexes, the lower refractive index phase(s) should be closest to the pigment surface. In this case, the lower refractive index phase(s) may have a thickness of at least 25 nm, preferably greater than 30 nm, most preferably greater than 40 nm, and the difference in refractive indexes of the first and second polymer phases may be at least 0.03, preferably at least 0.035, more preferably at least 0.04, most preferably at least 0.045

In certain aspects of the present invention a composition such as, for example, a coating or a plastic, includes a second polymer that is present either, at least in part, within the polymeric shell or present outside the opacifying particles that are at least partially encapsulated by the first polymer. This second polymer can be present from 0% to 600%, alternatively from 10% to 600%, preferably from 10% to 200%, more preferably from 15% to 150%, most preferably from 25% to 125% by weight, based on the weight of the first polymer. The refractive index of the second polymer may be at least 0.03, preferably at least 0.035, more preferably at least 0.04, most preferably at least 0.045 higher than the refractive index of the first polymer, or the phase of the first polymer which is in contact with the surface of the pigment particle in the case where the first polymer has more than one phase. If the second polymer consists of a blend of polymers, and/or multiphase polymer particles, then the weight of the second polymer is taken as the combined weights of the second polymers, and the refractive index of the second polymer is taken as the refractive index of the mixture of second polymers.

The polymer encapsulated pigment particles may be provided as an aqueous dispersion, or alternately they may be provided as a solid in the form of a powder or pellet. The polymer encapsulated pigment particles may be removed from the aqueous medium of an emulsion polymerization by any appropriate technique including, for example, evaporative drying, spray drying, filtration, centrifugation, or coagulation. When the polymer-encapsulated pigment particles are provided as a solid, it is preferred that the Tg of the first polymer, or the Tg of the outermost phase of the first polymer in the case where the first polymer contains multiple phases, is above the temperature at which the polymer-encapsulated pigment particles will be stored, transported, and optionally processed prior to final application.

The composition of the present invention including the opacifying pigment encapsulated in a first polymer and further encapsulated in, or in the presence of, a second polymer is typically a coating or a plastic. Optionally, the coating or plastic also includes one or more of extender particles, and secondary pigment particles.

The binder of the coating or plastic of the present invention is the continuous medium containing the polymer-encapsulated pigment particles. The binder may consist solely of the first polymer which encapsulates the pigment particles, or it may be a mixture of the encapsulating first polymer and one or more second polymers. Both the first polymer and second polymer are independently, alternatively a homopolymer, a copolymer, an interpenetrating network polymer, and a blend of two or more polymers or copolymers. Suitable second polymers include acrylic (co)polymers, vinyl acetate polymers, vinyl/acrylic copolymers, styrene/acrylic copolymers, polystyrenes, polyurethanes, polyureas, polyepoxides, polyvinyl chlorides, ethylene/vinyl acetate polymers, styrene/butadiene polymers, polyester polymers, polyethers, and the like, and mixtures thereof, given that the second polymer must have a refractive index of at least 0.03 higher than that of the first polymer that encapsulates the pigment particles.

The first polymers and second polymers which form the binder typically have glass transition temperatures in the range of from −60° C. to 150° C., as calculated by the Fox equation [*Bulletin of the American Physical Society* 1, 3 Page 123 (1956)]. The coating or plastic composition optionally contains coalescents or plasticizers to provide the polymers with effective film formation temperatures at or below the temperature at which the coating is applied or cured, or the plastic part is formed. The level of optional coalescent is typically in the range of from 0 to 40 wt %, based on the weight of the polymer solids.

The coating or plastic of this invention optionally contains extender particles. The extender particles do not significantly scatter light. Extender particles herein have a refractive index of less than 1.8 and typically greater than or equal to 1.3. Suitable extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc. Other examples of extenders include solid bead extenders, also known in the art as solid bead pigments, such as polystyrene and polyvinyl chloride beads.

The coating or plastic of this invention optionally contains secondary pigment particles. The secondary pigment particles have a refractive index less than the refractive index of the polymer matrix. Secondary pigment particles include pigment particles containing air voids, such as polymer particles containing air voids. The air void is characterized as having an refractive index close to or equal to 1. Secondary pigment particles including microsphere pigments such as polymer particles containing one or more voids and vesiculated polymer particles are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422.

The coating or plastic of this invention typically includes from 1% to 50%, preferably from 3% to 30%, more preferably from 4% to 25%, still more preferably from 8% to 20% and most preferably from 10% to 16%, by volume pigment particles in the form of polymer-encapsulated pigment particles, based on the total volume of the coating or plastic.

The coating composition of the present invention optionally may also include other materials commonly found in coatings such as wetting agents, defoamers, rheology modifiers, crosslinkers, dyes, pearlescents, adhesion promoters, dispersants, leveling agents, optical brighteners, ultraviolet stabilizers, preservatives, biocides, and antioxidants.

Examples of "coatings" herein include inks, paper coatings; architectural coatings, such as interior and exterior house paints, wood coatings and metal coatings; coatings for leather; coatings and saturants for textiles and nonwovens; adhesives; powder coatings; and traffic paints such as those paints used to mark roads, pavements, and runways. Liquid coatings may be water or solvent based. When the coating is a powder coating, it is preferred that the Tg of the first polymer, or the Tg of the outer most phase of the polymeric shell in the case where the polymeric shell contains multiple phases, and the Tg of the second polymer is above the temperature at which the coating will be stored, transported, and optionally processed prior to final application. When the coating is a solvent-based coating, it is preferred that the first polymer of the polymer-encapsulated pigment particles is not substantially soluble in the solvent or mixture of solvents utilized in the coating.

The examples which follow illustrate aspects of the present invention.

ABBREVIATIONS

BA=Butyl acrylate
MMA=Methyl methacrylate
ALMA=Allyl methacrylate
STY=Styrene
MAA=Glacial methacrylic acid
g=grams
mm=millimeters
cm=centimeters
mil=0.001 inch Measurement of Hiding (Opacity) of coatings. Two thin films were drawn down over two black release charts (Leneta # RC-BC) using a 1.5 mil Bird bar (BYK-Gardner; Columbia, Md.). A thick film was drawn down over a black vinyl scrub chart (Lenta # P121010N) using a bar with a 25 mil gap. The films were dried over night at ambient temperature and relative humidity. Two 8.3 cm by 10.2 cm rectangular areas were inscribed into each thin film using a razor blade. The Y-reflectance of the dry films were measured by a reflectometer, Microlight (BYK-Gardner; Columbia, Md.); for the thin films the average Y-reflectance was determined for each of the four inscribed rectangular areas, which were then peeled off of the charts and weighed to 0.0001 g. The Kubelka-Munk scattering coefficient S/mil was then calculated for each inscribed rectangular area by the equation:

$$S/mil = X^{-1} * (Y_\infty/(1-Y_\infty^2)) * \ln((1-Y*Y_\infty)/(1-Y/Y_\infty))$$

where X is the thickness of the dry film in mils, $Y_\infty$ is the Y-reflectance of the thick film, Y is the average Y-reflectance of the inscribed rectangular area of the thin film, and $$X = 1000 * W/(\rho * 8.3 * 10.2 * 2.54)$$

where W is the weight of the inscribed rectangular area in g and $\rho$ is the dry density of the film in g/cm$^3$. The average S/mil for a coating is the average of the S/mil values measured for the four inscribed rectangular areas. The average S/mil is considered accurate (one standard deviation) to +/−1.5%.

EXAMPLES 1-5 and COMPARATIVE EXAMPLE A

Preparation and Evaluation of Coating Compositions

Coatings were prepared using polymers indicated in Table 1.1. The coatings were all 5PVC using Ti-Pure™ R-706, i.e., 5% by volume pigment particles in the form of polymer-encapsulated pigment particles, based on the total volume of the dry coating.
Phase 1 of the polymeric shell at least partially encapsulating the titanium dioxide was 59.2 BA/39.3 MMA/1 MAA/0.5 ALMA (Refractive index=1.48)
Phase 2 of the polymeric shell substantially external to Phase 1 was 60 BA/39 Sty/1 MAA (Refractive index=1.53)
Second polymer was 48 BA/50 Sty/2 MAA RI=1.54

TABLE 1.1

Compositions and Hiding Evaluation

| Example | Encapsulating Polymer- Phase 1 shell thickness | Encapsulating Polymer- Phase 2 shell thickness | Wt. % Second polymer (based on wt of first polymer) | Hiding- S/mil |
|---|---|---|---|---|
| 1 | 28 nm | 55 nm | 474 | 2.35 |
| 2 | 39 nm | 43 nm | 477 | 2.45 |
| 3 | 49 nm | 34 nm | 452 | 2.52 |
| 4 | 53 nm | 23 nm | 493 | 2.51 |
| 5 | 78 nm | 0 nm | 481 | 2.56 |
| Comp. Ex. A | | | Second polymer only | 2.37 |

Coating compositions of the invention, Examples 2-5 exhibit substantially greater hiding Comparative Example A absent encapsulating polymer while Example 1 is within experimental error equivalent to Comparative Example A.

EXAMPLES 6-10 and COMPARATIVE EXAMPLE B

Preparation and Evaluation of Coating Compositions

Coatings were prepared using polymers indicated in Table 6.1. The coatings were all 16PVC using Ti-Pure™ R-706, i.e., 16% by volume pigment particles in the form of polymer-encapsulated pigment particles, based on the total volume of the dry coating.
Phase 1 of the polymeric shell at least partially encapsulating the titanium dioxide was 59.2 BA/39.3 MMA/1 MAA/0.5 ALMA (Refractive index=1.48)
Phase 2 of the polymeric shell substantially external to Phase 1 was 60 BA/39 Sty/1 MAA (Refractive index=1.53)
Second polymer was 48 BA/50 Sty/2 MAA RI=1.54

TABLE 6.1

Coatings and Hiding Evaluation

| Example | Encapsulating Polymer- Phase 1 shell thickness | Encapsulating Polymer- Phase 2 shell thickness | Wt.% Second polymer (based on wt of first polymer) | Hiding- S/mil |
|---|---|---|---|---|
| Comp. Ex. B | 0 nm | 80 nm | 59 (based on Phase 2 wt.) | 6.15 |
| 6 | 28 nm | 55 nm | 59 | 6.46 |
| 7 | 39 nm | 43 nm | 59 | 6.98 |
| 8 | 49 nm | 34 nm | 52 | 7.26 |
| 9 | 53 nm | 23 nm | 64 | 7.10 |
| 10 | 78 nm | 0 | 62 | 7.60 |

Coating compositions of the invention, Examples 6-10 exhibit significantly greater hiding relative to that of Comparative Example B absent the lower refractive index phase at least partially encapsulating TiO2.

I claim:

1. An opacifying particle comprising a pigment particle having an average particle diameter of from 0.15 micron to 1.0 micron and a refractive index of at least 1.8, said pigment particle being at least partially encapsulated in a polymeric shell having a calculated thickness of from 35 nm to 200 nm, wherein said polymeric shell comprises at least a first polymer phase and a second polymer phase, wherein said first polymer is substantially in contact with the surface of said pigment particle providing a calculated shell thickness of at least 25 nm. and wherein said first polymer has a refractive index of at least 0.03 units less than the refractive index of said second polymer.

2. A composition comprising pigment particles having an average particle diameter of from 0.15 micron to 1.0 micron and a refractive index of at least 1.8, said pigment particles being at least partially encapsulated in a shell of a first polymer having a calculated thickness of from 25 nm to 200 nm, and said encapsulated pigment particles in contact with from 10% to 600% by weight, based on the weight of said first polymer, second polymer, wherein said first polymer has a refractive index of at least 0.03 units less than the refractive index of said second polymer.

3. The composition of claim 2 wherein said pigment particles are present in an amount of from 4% to 25% by volume pigment particles in the form of said encapsulated pigment particles, based on the total volume of said composition.

4. A composition comprising pigment particles having an average particle diameter of from 0.15 micron to 1.0 micron and a refractive index of at least 1.8, said pigment particles being at least partially encapsulated in a polymeric shell having a calculated thickness of from 35 nm to 200 nm, wherein said polymeric shell comprises at least a first polymer phase and a second polymer phase, wherein said first polymer is substantially in contact with the surface of said pigment particle providing a calculated shell thickness of at least 25 nm and wherein said first polymer has a refractive index of at least 0.03 units less than the refractive index of said second polymer.

5. The composition of claim 4 wherein said pigment particles are present in an amount of from 4% to 25% by volume pigment particles in the form of said encapsulated pigment particles, based on the total volume of said composition.

* * * * *